United States Patent
Negami

(10) Patent No.: US 9,434,836 B2
(45) Date of Patent: Sep. 6, 2016

(54) EPDM COMPOSITION FOR TORSIONAL DAMPER

(71) Applicant: NOK Corporation, Tokyo (JP)

(72) Inventor: Tetsuro Negami, Tottori (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 14/652,064

(22) PCT Filed: Jun. 17, 2014

(86) PCT No.: PCT/JP2014/065960
§ 371 (c)(1),
(2) Date: Jun. 12, 2015

(87) PCT Pub. No.: WO2015/012018
PCT Pub. Date: Jan. 29, 2015

(65) Prior Publication Data
US 2016/0177076 A1    Jun. 23, 2016

(30) Foreign Application Priority Data

Jul. 25, 2013  (JP) .................................. 2013-154754

(51) Int. Cl.
*C08L 23/16*    (2006.01)
*C08K 3/04*    (2006.01)
*F16F 1/36*    (2006.01)

(52) U.S. Cl.
CPC .............. *C08L 23/16* (2013.01); *F16F 1/3605* (2013.01)

(58) Field of Classification Search
CPC .......... C08L 23/02; C08L 23/16; C08K 3/04

USPC .......................................................... 524/495
See application file for complete search history.

(56) References Cited

U.S. PATENT DOCUMENTS

| | | | | |
|---|---|---|---|---|
| 8,991,573 B2 * | 3/2015 | Sanpei | .................... | C08L 23/16 188/378 |
| 2009/0239014 A1 * | 9/2009 | Noguchi | ................. | C08F 10/00 428/36.8 |
| 2010/0029811 A1 * | 2/2010 | Shirose | .................... | C08K 3/04 524/59 |
| 2012/0232208 A1 * | 9/2012 | Saito | ........................ | C08L 7/00 524/493 |

FOREIGN PATENT DOCUMENTS

| | | |
|---|---|---|
| JP | 859924 | 3/1996 |
| JP | 200364227 | 3/2003 |
| WO | WO2005057045 | 6/2005 |

* cited by examiner

*Primary Examiner* — Vu A Nguyen
(74) *Attorney, Agent, or Firm* — K. David Crockett, Esq.; Crockett & Crockett, PC

(57) ABSTRACT

An EPDM composition for a torsional damper. The EPDM composition is made of (a) an EPDM polymer, (b) liquid polyolefin oligomer, and (c) carbon black, the EPDM composition containing 100 parts by weight of EPDM polymer that is the EPDM polymer of (a) having a propylene content of 35 to 50 wt % in the total amount of ethylene and propylene, 5 to 30 parts by weight of liquid polyolefin oligomer that is the liquid polyolefin oligomer of (b) having a number average molecular weight Mn within a range of 3,000 to 4,000, and 10 to 120 parts by weight of carbon black that is the carbon black of (c) having a nitrogen adsorption specific surface area within a range of 100 to 150 $m^2/g$, an iodine adsorption within a range of 110 to 160 mg/g, and a DBP oil absorption within a range of 70 to 135 $cm^3/100$ g.

4 Claims, No Drawings

200
EPDM COMPOSITION FOR TORSIONAL DAMPER

TECHNICAL FIELD

The present invention relates to an EPDM composition for a torsional damper and, more particularly, to an EPDM composition for a torsional damper achieving a high damping performance with well-balanced physical properties required for the torsional damper.

BACKGROUND

A torsional damper (TVD) is attached to a crankshaft for the purpose of reduction of engine vibration (reduction of torsional vibration of the crankshaft).

For example, the torsional damper is configured such that a hub (a vibrating body) attached to a shaft end of the crankshaft is coupled to an annular mass member (damper wheel) disposed on the outer circumference thereof, via an elastic body made of rubber.

Positive and negative accelerations are alternately generated in the crankshaft in accordance with the drive of an engine, resulting in a natural frequency. On the other hand, the mass member disposed on the crankshaft attempts to continue rotating at a constant rotation speed. Therefore, the interposed torsional damper is required to have a function of absorbing a change in angular speed therebetween. Thus, a main function of the torsional damper is to match a torsional-direction natural frequency of the torsional damper to a natural frequency generated in the crankshaft to reduce the torsional vibration of the crankshaft for preventing breakage of the crankshaft and reducing noise. The natural frequency of the torsional damper is determined depending on a spring constant of rubber and inertial mass of a vibration ring.

To tune the natural frequency of the torsional damper, a rubber material used for the torsional damper is required to have hardness variation (type A durometer) on the order of Hs 50 to 80°.

To reduce a change in natural frequency due to working temperature and enable absorption of vibration in a wider temperature range, the rubber material is required to have favorable heat resistance of a rubber elastic body and favorable temperature dependence of a spring constant (favorable temperature characteristic of vibration characteristic (E')).

Although the tuning is conventionally performed by using the spring constant at 60° C. to absorb vibration in a normal working temperature range that is a temperature range of about 20 to 100° C., a working range of the torsional damper exceeds 100° C. on the high temperature side and, therefore, favorable hot physical properties at high temperature are also required.

A current mainstream torsional damper is of a fitting type fabricated by press-fitting rubber molded by vulcanizing molding into a ring shape between the hub attached to the crankshaft and the vibration ring. Since the vibration ring is prevented from slipping by compression stress of this fitting torsional damper, degrading of repulsive stress associated with fitting compression must be small over time.

Although conventional EPDM material has well-balanced physical properties in terms of the hardness variation, the temperature dependence of the spring constant, the hot physical properties, and the repulsive stress at the time of fitting, the EPDM material has smaller tan δ in vibration characteristic as compared to NBR material, ACM material, AEM material, and IIR material and tends to have smaller vibration reduction effect. Therefore, it is desirable to develop EPDM material having a high damping performance.

For this goal, attempts have been made to realize desired physical properties and a high damping performance by changing formulation of compositions.

For example, Patent Document 1 proposes to use for a damper a crosslinked substance of an EPDM composition made of (a) 100 parts by weight of EPDM that is at least one type of EPDM having a propylene content (C3/(C2+C3)) of 35 to 50 wt % in the total amount of ethylene and propylene in the copolymer rubber and Mooney viscosity (ML100) of 40 or more, (b) 5 to 50 parts by weight of a-olefin oligomer that is polymer of an α-olefin represented by a general formula CH2=CHR (where R is an alkyl group having a carbon number of 3 to 12) and that has a number average molecular weight Mn of 300 to 1,400, and (c) 1 to 10 parts by weight of an organic peroxide crosslinking agent. The crosslinked substance of the EPDM composition produces effects of improving the temperature dependence of the spring constant in a low temperature range, achieving a favorable damping performance at normal working temperature, suppressing vibration amplification at a resonance point, and achieving favorable durability.

With regard to physical properties of an EPDM composition, Patent Document 2 proposes a rubber composition for heat-resistant conveyor belts acquired by blending 100 parts by weight of ethylene-propylene rubber with 5 to 25 parts by weight of ethylene-α-olefin oil and describes that the abrasion resistance and the cracking resistance of the EPDM composition can be improved by using ethylene-α-olefin oil as a softener.

In Patent Document 3, low hardness (equal to or less than JIS-A of 10) and high damping performance are attained by an EPDM composition that is made of 100 parts by weight of oil-extended EPDM (as EPDM), 20-150 parts by weight of ethylene-α-olefin copolymer having a number average molecular weight Mn of 10,000 or less, and 10 to 150 parts by weight of an ester plasticizer and that is crosslinked (vulcanized) with a sulfur-based vulcanizing agent.

However, if the high damping performance is achieved by simply changing formulation, since well-balanced physical properties of conventional material are significantly degraded and original features of EPDM material are damaged, a problem still remains in that not all the required physical properties are satisfied.

PRIOR ART DOCUMENTS

Patent Documents

Patent Document 1: WO 2005/057045
Patent Document 2: JP-A-8-059924
Patent Document 3: JP-A-2003-064227

SUMMARY OF THE INVENTION

Problem to be Solved by the Invention

The present inventors focused on steric hindrance of polymer, interaction of polymer side chains, and interaction between polymer and carbon black as factors having an influence on improvement in damping characteristics of a rubber composition, selected a type of the carbon black from an SAF grade, an ISAF grade, or an ISAF-LS grade, for example, and found that a high damping performance can be achieved through interaction with polymer by adding liquid polyolefin oligomer having good compatibility with EPDM.

The present inventors focused on the fact that EPDM material can be adjusted in physical properties by changing composition and molecular weight of polymer, were able to ascertain optimum polymer molecular weight and polymer composition, and therefore found out that an EPDM composition can be provided that achieves a high damping performance as well as well-balanced physical properties in terms of requirements of a torsional damper.

Therefore, a problem of the present invention is to provide an EPDM composition for a torsional damper achieving a high damping performance and well-balanced physical properties required for the torsional damper.

Other problems solved by the present invention will become apparent from the following description.

Means for Solving Problem

The problem is solved by the following aspects of the invention.

1. An EPDM composition for a torsional damper comprising
   (a) an EPDM polymer,
   (b) liquid polyolefin oligomer, and
   (c) carbon black,
   wherein 100 parts by weight of EPDM polymer that is the EPDM polymer of (a) having a propylene content of 35 to 50 wt % in the total amount of ethylene and propylene,
   5 to 30 parts by weight of liquid polyolefin oligomer that is the liquid polyolefin oligomer of (b) having a number average molecular weight Mn within a range of 3,000 to 4,000 and
   10 to 120 parts by weight of carbon black that is the carbon black of (c) having a nitrogen adsorption specific surface area within a range of 100 to 150 $m^2/g$, an iodine adsorption within a range of 110 to 160 mg/g, and a DBP oil absorption within a range of 70 to 135 $cm^3/100$ g.

2. The EPDM composition for a torsional damper of 1, wherein the carbon black of (c) is at least any one selected from SAF carbon black, ISAF carbon black, or ISAF-LS carbon black.

3. The EPDM composition for a torsional damper of 1 or 2, wherein a 1 to 20 parts by weight of aromatic modified terpene resin is contained.

Effect of the Invention

The present invention enables provision of an EPDM composition for a torsional damper achieving a high damping performance, having hardness Hs of 50° to 80°, favorable temperature dependence of a spring constant, favorable hot physical properties during high temperature, and repulsive stress less degraded due to fitting compression at the time of manufacturing, and achieving well-balanced physical properties suitable for the torsional damper.

DESCRIPTION OF THE PREFERRED EMBODIMENTS

An embodiment of the present invention will now be described.

<EPDM> The EPDM polymer of (a) used in the present invention is mainly composed of ethylene/propylene/nonconjugated diene ternary copolymer. From viewpoints of the durability, the hot physical properties, the temperature dependence of the spring constant, and the repulsive stress at the time of fitting, the EPDM polymer is preferably used that has a propylene content (C3/(C2+C3)) adjusted to 35 to 50 wt % in the total amount of ethylene (C2) and propylene (C3) and Mooney viscosity ($ML_{1+4}$ (125° C.)) adjusted to 25 to 70 as an index of polymer molecular weight.

More preferably, the EPDM polymer has a propylene content (C3/(C2+C3)) adjusted to 40 to 45 wt % in the total amount of ethylene (C2) and propylene (C3) and Mooney viscosity ($ML_{1+4}$ (125° C.)) adjusted to 25 to 65.

The adjustment of the propylene proportion in the total amount of ethylene (C2) and propylene (C3) in the EPDM polymer of (a) is preferable because an increase in the propylene content of the polymer can reduce a composition deformation amount of the polymer at normal temperature or due to a thermal load applied during manufacturing steps. In the range of the propylene proportion described above, since pseudo crosslinking points increase in accordance with an increase in polymer molecular weight, the adjustment is preferable because the repulsive stress increases at the time of compression of rubber.

Although the temperature dependence of the spring constant is more improved when a polymer molecular weight is higher, when considering that an excessively high polymer molecular weight makes compression stress at the time of fitting larger and increases a load of a product rubber end portion to deteriorate durability, Mooney viscosity ($ML_{1+4}$ (125° C.)) is preferably within a range of 25 to 70.

The nonconjugated diene may be dicyclopentadiene (DCPD), 1,4-hexadiene (1,4-HD), dicyclooctadiene (DCOD), methylene norbornene, ethylidene norbornene (ENB), etc.

The EPDM polymer of (a) of the present invention preferably contains 7 wt % or more diene component.

As described in following Table 1, the EPDM polymer of (a) of the present invention preferably contains a rubber component having a propylene content (C3/(C2+C3)) of 35 to 50 wt % in the total amount of ethylene (C2) and propylene (C3), 7 wt % or more diene component, and Mooney viscosity ($ML_{1+4}$ (125° C.)) within a range of 25 to 70 and may solely be used or may be used in combination of a plurality of types as an EPDM mixture.

TABLE 1

| Rubber component | Copolymer composition (wt %) | | Mooney viscosity |
|---|---|---|---|
| | C3/(C2 + C3) | ENB | $ML_{1+4}$ (125° C.) |
| EPDM-1 | 47.3 | 9.0 | 65.0 |
| EPDM-2 | 44.7 | 7.7 | 60.0 |
| EPDM-3 | 43.4 | 8.1 | 56.0 |
| EPDM-4 | 43.4 | 8.1 | 28.0 |

Commercial products of EPDM used as the EPDM polymer of (a) of the present invention include, a "JSR EP" series manufactured by JSR Corporation, for example.

<Carbon Black> The carbon black used in the present invention is a carbon black having a nitrogen adsorption specific surface area within a range of 100 to 150 $m^2/g$, an iodine adsorption within a range of 110 to 160 mg/g, and a DBP oil absorption within a range of 70 to 135 $cm^3/100$ g, and is preferably a carbon black having a nitrogen adsorption specific surface area within a range of 106 to 142 $m^2/g$, an iodine adsorption within a range of 111 to 139 mg/g, and a DBP oil absorption within a range of 75 to 115 $cm^3/100$ g.

A primary particle diameter of the carbon black used in the present invention is preferably within a range of 10 to 29 nm and more preferably within a range of 10 to 25 nm and, in the present invention, one or more types can be selected and used from furnace carbon blacks such as SAF carbon black, SAF-HS carbon black, ISAF carbon black, ISAF-HM carbon black, ISAF-LM carbon black, ISAF-HS carbon black, or ISAF-LS carbon black. ISAF-LS carbon black is particularly preferable.

The nitrogen adsorption specific surface area, the iodine adsorption, and the DBP oil absorption are typical indexes indicative of characteristics of carbon black, and the nitrogen adsorption specific surface area is a value measured based on JIS K6217 and the iodine adsorption is measured based on JIS K6221, respectively, and the DBP oil absorption is a value measured in accordance with the method A (mechanical method) of JIS K6221.

The nitrogen adsorption specific surface area and the iodine adsorption are indexes of a total specific surface area including fine pores of carbon black. The DBP oil absorption is used for indirect quantification of structure through measurement of porosity between individual pieces of aggregate having positive correlation with the structure. A level of a characteristic value of each of the nitrogen adsorption specific surface area, the iodine adsorption, and the DBP oil absorption has a significant influence on a reinforcing property, extrusion characteristics, dispersibility, colorability, viscosity, and conductivity when carbon black is used in the rubber composition.

The primary particle diameter is an average diameter of a small spherical-shaped component (having a contour of microcrystal and inseparable) making up carbon black aggregate measured and calculated through electron micrographs and this is the same as a definition of a particle diameter described in "Carbon Black Yearbook 1998", No. 48 issued by Carbon Black Association. When the primary particle diameter of the present invention is calculated, an arithmetical mean is used.

In the present invention, the use of carbon black having a small particle diameter has a favorably influence on improvement in damping performance of the rubber composition because of interaction between polymer and carbon and is therefore preferably used.

The carbon black preferably used in the present invention is available as commercial products, which include "SAF carbon/Seast 9" (nitrogen adsorption specific surface area: 142 m$^2$/g, iodine adsorption: 139 mg/g, and DBP oil absorption: 115 cm$^3$/100 g), "ISAF carbon/Seast 6" (nitrogen adsorption specific surface area: 119 m$^2$/g, iodine adsorption: 121 mg/g, and DBP oil absorption: 114 cm$^3$/100 g), and "ISAF-LS carbon/Seast 600" (nitrogen adsorption specific surface area: 106 m$^2$/g, iodine adsorption: 111 mg/g, and DBP oil absorption: 75 cm$^3$/100 g) manufactured by Tokai Carbon.

To the EPDM composition of the present invention, the carbon block is added within a range of 10 to 120 parts by weight, preferably within a range of 20 to 100 parts by weight, per 100 parts by weight of the EPDM polymer of (a). This is because the high damping effect becomes small if an amount of the carbon block is less than 100 parts by weight, while a problem occurs in kneadability if the amount exceeds 120 parts by weight.

The parts of carbon described above may be added and blended with another carbon block as needed.

<Liquid Polyolefin Oligomer> In the present invention, at least one type of liquid polyolefin oligomer is added.

The liquid polyolefin oligomer used in the present invention is copolymer of ethylene and α-olefin and has the number average molecular weight Mn within a range of 3,000 to 4,000. The number average molecular weight Mn is preferably within a range of 3,500 to 3,900 and more preferably within a range of 3,600 to 3,800.

If the number average molecular weight Mn of polyolefin oligomer is less than 3,000, the damping performance deteriorates and, if exceeding 4,000, the low temperature characteristic deteriorates.

To the EPDM composition of the present invention, the liquid polyolefin oligomer is added in a proportion of 5 to 30 parts by weight, preferably 10 to 30 parts by weight, per 100 parts by weight of the EPDM polymer of (a). This is because if the parts by weight of liquid polyolefin oligomer are less than 5 parts by weight, the high damping effect becomes small and roll workability deteriorates and if exceeding 30 parts by weight, a problem occurs in kneadability and workability.

The liquid polyolefin oligomer used in the present invention can be, for example, "Lucant HC-2000" (number average molecular weight Mn: 3,700, kinematic viscosity at 100° C.: 2,000 mm$^2$/s, viscosity index: 300, and sulfur content: 0.1 mass % or less) manufactured by Mitsui Chemicals.

For further higher damping performance and well-balanced physical properties, a tackifying resin compatible with EPDM may preferably be added in a proportion of 1 to 20 parts by weight, more preferably 1 to 10 parts by weight, in addition to the carbon black and the polyolefin oligomer. The tackifying resin can be aromatic modified terpene resin etc. If the resin is added in a proportion exceeding 20 parts by weight, a composition deformation amount may increase, resulting in a problem of deterioration in the temperature dependence of the spring constant.

<Plasticizer> A plasticizer used in the EPDM composition of the present invention can be those used for normal rubber and thermoplastic elastomer. Examples of the plasticizer include, for example, petroleum softeners such as process oil, lubricating oil, and paraffin-base oil; fatty oil softeners such as castor oil, linseed oil, rapeseed oil, and coconut oil; ester plasticizers such as dibutyl phthalate, dioctyl phthalate, dioctyl adipate, and dioctyl sebacate; and hydrocarbon oligomer.

<Filler> A filer used in the EPDM composition of the present invention can be inorganic filler or organic filler such as those typically used in rubber other than the carbon blocks.

<Crosslinking Agent> A crosslinking agent used in the EPDM composition of the present invention can be any sulfur crosslinking agents or organic peroxide crosslinking agents and one or both types of these crosslinking agents may be used.

The sulfur crosslinking agents include, other than sulfur, 4,4'-dithiodimorpholine; tetramethylthiuram disulfide; tetraethylthiuram disulfide; tetrabutylthiuram disulfide; 2-mercaptoimidazoline; tetramethylthiuram monosulphide; N-cyclohexyl-2-benzothiazole sulfonamide; dibenzothiazyl disulfide; and sulfur-donating compounds such as polymeric polysulfide.

The organic peroxide crosslinking agents include, for example, 2,5-dimethylhexane-2,5-dihydroperoxide; 2,5-dimethyl-2,5-di(benzoylperoxy)hexane; tert-butyl peroxide; dicumyl peroxide; tert-butylcumyl peroxide; 1,1-di(tert-butylperoxy)-3,3,5-trimethylcyclohexane; 2,5-dimethyl-2,5-di(tert-butylperoxy)hexane; 2,5-dimethyl-2,5-di(tert-butylperoxy)hexyne-3; 1,3-di(tert-butylperoxyisopropyl)benzene; tert-butyl peroxybenzoate; tert-butylperoxy isopropyl carbonate; and n-butyl-4,4-di(tert-butylperoxy)valerate.

<Other additives> Other additives usable in the EPDM composition of the present invention may include generally used anti-aging agents (e.g., polymerized-2,2,4-trimethyl-1, 2-dihydroquinoline; and 2-mercaptobenzimidazole), auxiliary agents (e.g., zinc oxide and stearic acid), acid acceptors such as hydrotalcite.

<Manufacturing Method of Crosslinked Rubber> In the present invention, the rubber composition is prepared thorough kneading by a kneading machine such as an intermix, a kneader, a Banbury mixer, or an open roll, and is vulcanized by using a vulcanizing press, a compression molding machine, an injection molding machine, etc., typically through heating to about 150 to 200° C. for about 3 to 60 minutes, and oven vulcanization (secondary vulcanization) may also be performed as needed at 120 to 200° C. for about 1 to 24 hours.

EXAMPLES

The effect of the present invention will hereinafter be demonstrated by examples.

For the EPDM polymer of (a), EPDM-1 to 4 having characteristic values described in Table 1 (all contains 5-ethylidene-2-norbornene (ENB) as the diene component) are separately used or blended for use.

Example 1

| | |
|---|---|
| EPDM-1 ("KELTAN4703") manufactured by Lanxess) | 40 parts by weight |
| EPDM-4 ("JSR EP33") manufactured by JSR Corporation) | 60 parts by weight |
| ISAF-LS carbon black ("Seast 600") manufactured by Tokai Carbon) | 80 parts by weight |
| liquid polyolefin oligomer (number average molecular weight Mn: 3700) ("Lucant HC2000" manufactured by Mitsui Chemicals) | 10 parts by weight |
| zinc oxide | 5 parts by weight |
| stearic acid | 0.5 parts by weight |
| quinolone-based anti-aging agent | 0.5 parts by weight |
| liquid polybutadiene | 5 parts by weight |
| aromatic modified terpene resin | 10 parts by weight |
| dicumyl peroxide (DCP) | 3.3 parts by weight |
| sulfur | 0.05 parts by weight |

After the above components were kneaded by a kneader and an open roll to acquire unvulcanized, (green stock), the material was crosslinked by using a compression molding machine under the conditions of a temperature of 180° C. and a compression time of 6 minutes, and was further heat-treated by a heating oven at 150° C. for 4 hours to mold a crosslinked rubber sample of 2 mm in thickness as a test piece.

<Evaluation Method> The physical properties of the acquired test piece were measured with the following methods and the measurement result is described in Table 3.

1. Mooney Scorch:
Minimum Mooney viscosity Vm and scorch times t5 and t35 were measured under the temperature condition of the test temperature of 125° C. by using "Rotorless Mooney Viscometer (RLM-1)" manufactured by Toyo Seiki.

2. Normal Physical Properties:
Hardness Hs: conforming to JIS K6253: 1997 (Type A durometer) Tensile strength Tb (MPa): conforming to JIS K6251: 2010 Ultimate elongation Eb (%): conforming to JIS K6251: 2010

3. Heat Resistance:
(a) Change in Normal Physical Property Value (conforming to JIS K6257: 2010) Changes in the normal physical property value were evaluated at 150° C. after 70 hours. Specifically, a change in the hardness (degree of hardness) Hs is indicated by a change value ΔHs (point) from the normal physical properties. A change in the tensile strength Tb is indicated by a change rate ΔTb (%) from the normal physical properties and a change in the ultimate elongation Eb was indicated by a change rate ΔEb (%) from the normal physical properties. Favorable heat resistance is indicated by ΔHs≤7, ΔTb (%)≥−20, and ΔEb (%)≥−30.

(b) Compression Set (conforming to JIS K6262: 2006)
A compression set was measured at 150° C. after 70 hours. The compression set is preferably equal to or less than 30% and desirably equal to or less than 25%.

4. Hot Physical Properties:
A standard test piece conforming to JIS K6251: 2010 was prepared as is the case with the normal physical properties and, after using a tension testing machine including a thermostatic bath with an ambient atmospheric temperature of a jig holding the test piece maintained at 120° C. to leave the test piece in the thermostatic bath for 10 minutes, the tensile strength Tb (MPa) and the ultimate elongation Eb (%) were measured in accordance with JIS K 6251. It is noted that ○ indicates a test piece with Tb (MPa) within ranges equal to or greater than 4 and Eb (%) within ranges equal to or greater than 100, respectively, while x indicates a test piece satisfying neither Tb (MPa) nor Eb (%).

5. Kneadability/Workability:
For the kneadability/workability, the following items (1) to (3) were evaluated and it is noted that ○ indicates a test piece satisfying all the three items, while x indicates a test piece not satisfying any one or more of the items.
(1) A kneading time is within 30 minutes.
(2) A kneading machine is not contaminated after discharge of material.
(3) A rubber material is in close contact with a roll without separation and a bank is smoothly rotated so that favorable roll workability is acquired.

6. Temperature Characteristic of Vibration Characteristic (E'):
A storage elastic modulus (E') at 100 Hz was measured under a tension condition at 60° C. and 120° C. by using a viscoelastic spectrometer manufactured by UBM and, if an E' change rate is equal to or less than 36% at 120° C. as compared to 60° C., a test piece is indicated by ○, and otherwise, a test piece is indicated by x.

7. Damping Performance (Tan δ):
A viscoelastic spectrometer manufactured by UBM was used for measuring at 200 Hz under a tension condition at 60° C. and 120° C. If the value is equal to or greater than 0.150, a test piece can be determined as a favorable test piece, and the value is preferably equal to or greater than 0.155.

Example 2

A crosslinked rubber sample was molded in the same way as Example 1 except that the amounts of EPDM-2 and EPDM-4 in the EPDM polymer of (a) are changed to 40 parts by weight and 60 parts by weight, respectively, and was evaluated in the same way, and the result is described in Table 3.

Example 3

A crosslinked rubber sample was molded in the same way as Example 1 except that the amounts of EPDM-3 and EPDM-4 in the EPDM polymer of (a) are changed to 40 parts by weight and 60 parts by weight, respectively, and was evaluated in the same way, and the result is described in Table 3.

Example 4

A crosslinked rubber sample was molded in the same way as Example 1 except that the EPDM polymer of (a) is 100 parts by weight of EPDM-1 and that the amounts of ISAF-LS carbon black and liquid polyolefin oligomer (Mn: 3700) are changed to 90 parts by weight and 20 parts by weight, respectively, and was evaluated in the same way, and the result is described in Table 3.

Example 5

A crosslinked rubber sample was molded in the same way as Example 1 except that the EPDM polymer of (a) is changed to 100 parts by weight of EPDM-4, and was evaluated in the same way, and the result is described in Table 3.

Example 6

A crosslinked rubber sample was molded in the same way as Example 1 except that the EPDM polymer of (a) is changed to 100 parts by weight of EPDM-3, and was evaluated in the same way, and the result is described in Table 3.

Example 7

A crosslinked rubber sample was molded in the same way as Example 1 except that the amounts of EPDM-3 and EPDM-4 in the EPDM polymer of (a) are changed to 40 parts by weight and 60 parts by weight, respectively, and that the amount of liquid polyolefin oligomer (Mn: 3700) is changed to 20 parts by weight, and was evaluated in the same way, and the result is described in Table 3.

Example 8

A crosslinked rubber sample was molded in the same way as Example 1 except that the amount of liquid polyolefin oligomer (Mn: 3700) is changed to 30 parts by weight, and was evaluated in the same way, and the result is described in Table 3.

Comparison Example 1

A crosslinked rubber sample was molded in the same way as Example 1 except that the amounts of EPDM-3 and EPDM-4 in the EPDM polymer of (a) are changed to 40 parts by weight and 60 parts by weight, respectively, and that the amount of liquid polyolefin oligomer is changed to 0 parts by weight, and was evaluated in the same way, and the result is described in Table 3.

Comparison Example 2

A crosslinked rubber sample was molded in the same way as Example 1 except that the amounts of EPDM-3 and EPDM-4 in the EPDM polymer of (a) are changed to 40 parts by weight and 60 parts by weight, respectively, that 80 parts by weight of ISAF-LS carbon black are changed to 80 parts by weight of FEF carbon black ("Seast G-SO" manufactured by Tokai Carbon), and that the amount of liquid polyolefin oligomer is changed to 0 parts by weight, and was evaluated in the same way, and the result is described in Table 3.

Comparison Example 3

A crosslinked rubber sample was molded in the same way as Example 1 except that the amounts of EPDM-3 and EPDM-4 in the EPDM polymer of (a) are changed to 40 parts by weight and 60 parts by weight, respectively, that 80 parts by weight of ISAF-LS carbon black are changed to 80 parts by weight of HAF carbon black ("N330L" manufactured by Cabot), and that the amount of liquid polyolefin oligomer is changed to 0 parts by weight, and was evaluated in the same way, and the result is described in Table 3.

Comparison Example 4

A crosslinked rubber sample was molded in the same way as Example 1 except that 80 parts by weight of ISAF-LS carbon black are changed to 80 parts by weight of HAF carbon black ("N330L" manufactured by Cabot), and was evaluated in the same way, and the result is described in Table 3.

Comparison Example 5

A crosslinked rubber sample was molded in the same way as Example 1 except that the amount of liquid polyolefin oligomer (Mn: 3700) is changed to 40 parts by weight, and was evaluated in the same way, and the result is described in Table 3.

Comparison Example 6

A crosslinked rubber sample was molded in the same way as Example 1 except that 10 parts by weight of liquid polyolefin oligomer (Mn: 3700) are changed to 10 parts by weight of liquid polyolefin oligomer (Mn: 2600) ("Lucant HC600" manufactured by Mitsui Chemicals), and was evaluated in the same way, and the result is described in Table 3.

The physical properties of the carbon blacks are as described in Table 2.

TABLE 2

| Grade | Manufacturer | Product name | Nitrogen adsorption specific surface area ($m^2/g$) | Iodine adsorption (mg/g) | DBP oil absorption (method A) ($cm^3/100\ g$) |
|---|---|---|---|---|---|
| ISAF-LS | Tokai Carbon | Seast 600 | 106 | 111 | 75 |
| FEF | Tokai Carbon | Seast G-SO | 42 | 44 | 115 |
| HAF | Cabot | Shoblack N330L | 75 | 81 | 102 |

TABLE 3

| | | Example 1 | Example 2 | Example 3 | Example 4 | Example 5 | Example 6 | Example 7 |
|---|---|---|---|---|---|---|---|---|
| Variable amount (parts by weight) | EPDM-1 | 40 | — | — | 100 | — | — | — |
| | EPDM-2 | — | 40 | — | — | — | — | — |
| | EPDM-3 | — | — | 40 | — | — | 100 | 40 |
| | EPDM-4 | 60 | 60 | 60 | — | 100 | — | 60 |
| | ISAF-LS carbon black | 80 | 80 | 80 | 80 | 80 | 80 | 80 |
| | FEF carbon black | — | — | — | — | — | — | — |
| | HAF carbon black | — | — | — | — | — | — | — |
| | Liquid polyolefin oligomer (Mn: 3700) | 10 | 10 | 10 | 20 | 10 | 10 | 20 |
| | Liquid polyolefin oligomer (Mn: 2600) | | | | | | | |
| Other amount (parts by weight) | Aromatic modified terpene resin | 10 | 10 | 10 | 10 | 10 | 10 | 10 |
| EPDM polymer characteristics | C3/(C2 + C3)(wt %) | 45.0 | 43.9 | 43.4 | 47.3 | 43.4 | 43.4 | 43.4 |
| | ENB(wt %) | 8.5 | 7.9 | 8.1 | 9.0 | 8.1 | 8.1 | 8.1 |
| | ML: +4(125° C.) | 42.8 | 40.8 | 39.2 | 65.0 | 28.0 | 58.0 | 39.2 |
| Mooney scorch (125° C.) | Vm(M) | 51.5 | 50.5 | 46.5 | 64.0 | 37.0 | 53.5 | 33.5 |
| | t5(min) | 15.5 | 16.5 | 18.5 | 10.0 | 21.5 | 18.0 | 25.5 |
| | t35(min) | 27.0 | 30.5 | 28.0 | 22.0 | 38.5 | 27.0 | 41.5 |
| Normal physical characteristics | Hardness(Hs) | 75 | 74 | 74 | 74 | 74 | 75 | 69 |
| | Tensile strength Tb(MPa) | 22.0 | 20.0 | 21.0 | 21.0 | 21.0 | 23.0 | 19.5 |
| | Ultimate elongation Eb(%) | 280 | 270 | 280 | 290 | 320 | 280 | 335 |
| Heat resistance | Hardness change(points) | +4 | +4 | +5 | +6 | +7 | +5 | +6 |
| | Tensile strength change rate(%) | −12 | ±0 | −13 | −10 | −15 | −18 | −15 |
| | Ultimate elongation change rate(%) | −21 | −12 | −21 | −21 | −25 | −25 | −23 |
| | Compression set(%) | 23 | 22 | 25 | 23 | 26 | 22 | 26 |
| Hot physical properties (120° C.) | | ○ | ○ | ○ | ○ | ○ | ○ | ○ |
| Kneadability/Workability | | ○ | ○ | ○ | ○ | ○ | ○ | ○ |
| Vibration characteristic (E') temperature characteristic | | ○ | ○ | ○ | ○ | ○ | ○ | ○ |
| Damping Performance (tanδ) | 60° C. | 0.162 | 0.162 | 0.171 | 0.186 | 0.174 | 0.167 | 0.188 |
| | 120° C. | 0.155 | 0.157 | 0.168 | 0.155 | 0.171 | 0.160 | 0.179 |

| | | Example 8 | Comparison Example 1 | Comparison Example 2 | Comparison Example 3 | Comparison Example 4 | Comparison Example 5 | Comparison Example 6 |
|---|---|---|---|---|---|---|---|---|
| Variable amount (parts by weight) | EPDM-1 | 40 | — | — | — | 40 | 40 | 40 |
| | EPDM-2 | — | — | — | — | — | — | — |
| | EPDM-3 | — | 40 | 40 | 40 | — | — | — |
| | EPDM-4 | 60 | 60 | 60 | 60 | 60 | 60 | 60 |
| | ISAF-LS carbon black | 80 | 80 | — | — | — | 80 | 80 |
| | FEF carbon black | — | — | 80 | — | — | — | — |
| | HAF carbon black | — | — | — | 80 | 80 | — | — |
| | Liquid polyolefin oligomer (Mn: 3700) | 30 | 0 | 0 | 0 | 10 | 40 | — |
| | Liquid polyolefin oligomer (Mn: 2600) | | | | | | | 10 |
| Other amount (parts by weight) | Aromatic modified terpene resin | 10 | 10 | 10 | 10 | 10 | 10 | 10 |
| EPDM polymer characteristics | C3/(C2 + C3)(wt %) | 45.0 | 43.4 | 43.4 | 43.4 | 45.0 | 45.0 | 45.0 |
| | ENB(wt %) | 8.5 | 8.1 | 8.1 | 8.1 | 8.5 | 8.5 | 8.5 |
| | ML: +4(125° C.) | 42.8 | 39.2 | 39.2 | 39.2 | 42.8 | 42.8 | 42.8 |
| Mooney scorch (125° C.) | Vm(M) | 29.5 | 59.5 | 70.5 | 89.0 | 59.5 | 23.8 | 48.5 |
| | t5(min) | 23.7 | 13.5 | 17.0 | 12.5 | 13.0 | 28.5 | 14.0 |
| | t35(min) | 44.7 | 24.0 | 21.0 | 20.5 | 21.0 | 60.0 | 29.9 |
| Normal physical characteristics | Hardness(Hs) | 66 | 80 | 80 | 80 | 76 | 63 | 75 |
| | Tensile strength Tb(MPa) | 18.5 | 23.0 | 24.0 | 25.0 | 22.0 | 15.5 | 21.0 |
| | Ultimate elongation Eb(%) | 360 | 250 | 205 | 205 | 230 | 400 | 280 |
| Heat resistance | Hardness change(points) | +5 | +4 | +3 | +5 | +5 | +5 | +5 |
| | Tensile strength change rate(%) | −15 | −11 | −8 | −5 | −6 | −12 | −12 |
| | Ultimate elongation change rate(%) | −18 | −24 | −18 | −14 | −14 | −18 | −22 |
| | Compression set(%) | 25 | 24 | 12 | 17 | 17 | 26 | 23 |
| Hot physical properties (120° C.) | | ○ | ○ | ○ | ○ | ○ | ○ | ○ |
| Kneadability/Workability | | ○ | X | X | X | ○ | X | ○ |
| Vibration characteristic (E') temperature characteristic | | ○ | ○ | ○ | ○ | ○ | ○ | ○ |
| Damping Performance (tanδ) | 60° C. | 0.190 | 0.151 | 0.119 | 0.125 | 0.142 | 0.210 | 0.154 |
| | 120° C. | 0.175 | 0.146 | 0.114 | 0.125 | 0.141 | 0.188 | 0.145 |

<Evaluation> It is confirmed from Table 3 that when the EPDM composition is made of 100 parts by weight of EPDM having a propylene content within a range of 35 to 50 wt % in the total amount of ethylene and propylene of the EPDM polymer of (a), 5 to 30 parts by weight of liquid polyolefin oligomer having the number average molecular weight Mn of 3,000 to 4,000, and 80 to 90 parts by weight of ISAF-LS carbon black, the EPDM composition has the hardness of 60 to 80°, satisfies the damping performance tan δ equal to or greater than 0.150, is favorable in terms of the heat resistance, the hot physical properties, and the vibration characteristic, and is also favorable without a problem in terms of the other normal physical properties, the kneadability, and the workability.

In contrast, it is understood that Comparison Example 1 has the damping performance and the kneadability/workability deteriorated as compared to Examples since the content of liquid polyolefin oligomer is zero. It is understood that Comparison Examples 2 and 3 have the damping performance deteriorated as compared to Comparison Example 1 because of the use of FEF carbon block with a large particle diameter or HAF carbon black.

It is understood that Comparison Example 4 has the damping performance deteriorated as compared to Examples because of the use of HAF carbon black.

It is understood that, although a good damping performance value is acquired, Comparison Example 5 has the kneadability/workability deteriorated as compared to Examples 1 to 3 since the content of liquid polyolefin oligomer is increased to 40 parts by weight.

On the other hand, it can be confirmed that Comparison Example 6 with the number average molecular weight of liquid polyolefin oligomer set to 2,600 has the damping performance deteriorated even though the amount is 10 parts by weight.

The invention claimed is:

1. An EPDM composition for a torsional damper comprising:
   (a) 100 parts by weight of an EPDM polymer having a propylene content of 35 to 50 wt % in the total amount of ethylene and propylene,
   (b) 5 to 30 parts by weight of liquid polyolefin oligomer having a number average molecular weight Mn within a range of 3,000 to 4,000, and
   (c) 10 to 120 parts by weight of carbon black having a nitrogen adsorption specific surface area within a range of 100 to 150 $m^2/g$, an iodine adsorption within a range of 110 to 160 mg/g, and a DBP oil absorption within a range of 70 to 135 $cm^3/100$ g.

2. The EPDM composition for a torsional damper of claim 1, wherein the carbon black of (c) is at least any one selected from SAF carbon black, ISAF carbon black, or ISAF-LS carbon black.

3. The EPDM composition for a torsional damper of claim 1, further comprising 1 to 20 parts by weight of aromatic modified terpene resin.

4. The EPDM composition for a torsional damper of claim 2, further comprising 1 to 20 parts by weight of aromatic modified terpene resin.

* * * * *